United States Patent [19]

Morikawa et al.

[11] Patent Number: 5,560,919
[45] Date of Patent: Oct. 1, 1996

[54] FEED ADDITIVE FOR RUMINANTS SUITABLE FOR USE IN A FEED PELLET AND FEED PELLET FOR RUMINANTS APPLYING THE SAME

[75] Inventors: Takao Morikawa; Seiji Sasaoka, both of Chiba; Masaichi Furuta, Fukushima; Shigeru Saito; Masato Sugawara, both of Chiba, all of Japan

[73] Assignee: Nippon Soda Co., Ltd., Tokyo, Japan

[21] Appl. No.: 244,278

[22] PCT Filed: Sep. 21, 1993

[86] PCT No.: PCT/JP93/01355

§ 371 Date: Nov. 30, 1994

§ 102(e) Date: Nov. 30, 1994

[87] PCT Pub. No.: WO94/06307

PCT Pub. Date: Mar. 3, 1994

[30] Foreign Application Priority Data

| Sep. 22, 1992 | [JP] | Japan | 4-276771 |
| Dec. 25, 1992 | [JP] | Japan | 4-359501 |
| Feb. 23, 1993 | [JP] | Japan | 5-057775 |
| Jun. 2, 1993 | [JP] | Japan | 5-156304 |
| Jun. 18, 1993 | [JP] | Japan | 5-172153 |

[51] Int. Cl.$^6$ .................................................. A23K 1/18
[52] U.S. Cl. .......................... 424/438; 424/484; 424/489; 424/490; 426/807
[58] Field of Search .................................. 424/438, 484, 424/489, 490; 426/807

[56] References Cited

U.S. PATENT DOCUMENTS 5,244,669  9/1993  Satoh ........................................ 424/438

FOREIGN PATENT DOCUMENTS

| 3-155757 | 7/1991 | Japan . |
| 3-280838 | 12/1991 | Japan . |
| 4-79844 | 3/1992 | Japan . |
| 4-218342 | 8/1992 | Japan . |

*Primary Examiner*—D. Gabrielle Phelan
*Attorney, Agent, or Firm*—Jacobson, Price, Holman & Stern, PLLC

[57] ABSTRACT

The present invention relates to a pelletization-resistant rumen bypass formulation of a feed additive resistant to pelletization by applying a reinforcement measure resisting to a mechanical stress during the pelletization and humidification and heating at steaming, etc. to a rumen bypass formulation formed of biologically active principles and protective matrices and a feed pellet for ruminants containing said pelletization-resistant rumen bypass formulation therein. More particularly, the present invention relates to a pelletization-resistant rumen bypass formulation prepared by including one or more rumen bypass formulations formed of biologically active principles and protective matrices in the moldings of various types of macromolecules described above (pelletization-resistant protective matrices) having a shape retaining property during a process of pelletization, and a feed pellet for ruminants applying the same. The present invention enabled the practical use of feed pellets containing the rumen bypass formulation which was not practically possible to formulate in the past.

13 Claims, No Drawings

FEED ADDITIVE FOR RUMINANTS SUITABLE FOR USE IN A FEED PELLET AND FEED PELLET FOR RUMINANTS APPLYING THE SAME

TECHNICAL FIELD

The present invention relates to a technology to include a rumen by-pass formulation of a feed additive for ruminants in a feed pellet. More particularly, the present invention relates to a pelletization-resistant rumen by-pass formulation of a feed additive which can be pelletized without losing its rumen by-pass property by coating the rumen bypass formulation molded from biologically active principles and protective matrices with pelletization-resistant protective matrices such as natural macromolecules and synthetic macromolecules as a reinforcement measure to resist to a mechanical stress imposed during pelletization process and to humidification and heating at steaming, etc., and feed pellets for ruminants comprising said pelletization-resistant rumen bypass formulation containing the feed additive as the component.

BACKGROUND ART

In breeding of ruminants, simultaneous feeding of the rumen bypass formulation with fodders has been spreading among livestock farmers because such method is dietetically and clinically advantageous. However, there is a problem that livestock do not like the taste of rumen bypass formulation, and that a work to individually weigh and feed the rumen bypass formulation is quite troublesome for the livestock farmers. On the other hand, the use of feed pellets have also been spread among the livestock farmers since it can reduce labors required for feeding operation and a give a chance to automate the operation.

Therefore, it is expected that a feed pellet comprising the rumen bypass formulation as its component can be an useful feed for livestock, as it can utilize both advantages of the rumen bypass formulation and the feed pellet and may solve the problems described above.

The rumen bypass formulation for ruminants described above comprises one or more of various amino acids, various vitamins and other biologically active principles, and which has a function to restrict the elution and the microbiological degradation of the biologically active principles in a rumen (first ruminant stomach) of ruminants while to allow the elution and absorption of the biologically active principles in digestive organs after fourth ruminant stomach. The concept and many practical examples of the rumen bypass formulation have already been known to the public.

However, the rumen bypass formulation in the past appear to have been composed without considering the pelletization thereof. Such rumen bypass formulations, either in a form protectively coating the particles of biologically active principles or in a form wherein biologically active principles are dispersed in oils and fats, are destroyed due to a mechanical stress, humidification and heating which are imposed during the pelletization process to the extent that the original shape thereof cannot be distinguished.

As several examples are shown in the comparative examples in the present specification later, the inventors of the present invention attempted to formulate these known rumen bypass formulations, then tried the pelletization of the rumen bypass formulation combined with feedstuffs to have a feed pellet. However, in every cases, the rumen bypass formulation therein were destroyed, so that the rumen bypass effect of the pellets was lost or extremely ceased, which made the formulation practically useless.

In U.S. Pat. No. 5,068,108, the concept of providing the resistance to pelletization, which is to mechanically reinforce the rumen bypass formulation by combining macromolecular substances therein is described. However, the examples described therein teach just the composition of the rumen bypass formulation, but the performance thereof and the evaluation of the rumen bypass effect after pelletization were not described at all.

The inventors of the present invention could not obtain a desired feed pellet according to the description of the example in the above U.S. Patent. The feed pellets obtained were insufficient in mechanical strength even by combining the rumen bypass formulation with macromolecular substance, and the rumen bypass formulation were destroyed during pelletizing process by a pellet mill to an extent that the original shape thereof can not be distinguished therefore, the rumen bypass effect of the feed pellet was extremely ceased, accordingly.

In the Gazette of Japanese Patent Laid-opened No. Hei 4-79844, a method to prevent the elution of a protective coat, which dissolve when it contacted to amidic feeds, comprising by forming a second coat over the circumference of the rumen bypass formulation coated with said protective coat is disclosed, however, there is not provided the concept as to the resistance of said double-coated rumen bypass formulation against mechanical stress, humidification and heating, and the pelletization of such formulation in the disclosure.

The feed pellet for ruminants disclosed in the Gazette of Japanese Patent Laid-opened No. Hei 4-218342 is formed according to a method which molds a rumen bypass formulation placed in a cavity together with injected melting substance therein by cooling them to solidify in a form of pellets therefore, it is different from the pellets of the present invention which is molded by using a common rotary die or other type of pellet mill. Furthermore, the result that conventional rumen bypass formulations were easily destroyed during pelletization by using the rotary die pellet mill or the like is described in the specification of the Gazette described above.

DISCLOSURE OF INVENTION

The fact that there are many advantages obtainable from the inclusion of the rumen bypass formulation in a feed pellet have been known in the art, however, it was practically difficult because the rumen bypass formulation was destroyed when it was applied with mechanical stress by a pellet mill and humidification and heating at steaming process during pelletization.

In view of such defects in the prior arts, it is an object of the present invention to provide a practically-usable feed pellet including the rumen bypass formulation by utilizing the both advantages of rumen bypass formulation and the feed pellet and to solve the problems described above. As a result, the feed pellet of the present invention can be an useful feedstuff for ruminants, such as cows and sheeps.

The inventors of the present invention attempted to combine biologically active principles in a common synthetic resin, such as polypropylene and ethylene-vinyl acetate copolymer to obtain a formulation, them pelletizing it with feedstuffs. As a result, they found that the feed pellets prepared can maintain the elution of biologically active principles therefrom into a rumen at a level as low as that of said formulation prior to the pelletization, which suggests that such formulation has an excellent resistance against pelletization. However, these synthetic resins used are not preferable for the use as a feed, and it is also found that the elution and absorption of the synthetic resins at after fourth rumen stomach was found to be insufficient.

Nevertheless, the resistant property of such synthetic resins against pelletization are valuable to notice. The modulus of elasticity is from $10^8$ to $10^{11}$ dyne/cm$^2$ at 30° C. and glass transition points of from 50° to 120° C. by a dynamic viscoelasticity measurements of these synthetic resins. This result is suggest the range of the physical properties required for a desired rumen bypass formulation resistant to pelletization.

On the other hand, it was found that the physical properties of many dried moldings formed by containing natural macromolecules usable as a feed as the main component such as starch, proteins or the like or moldings formed of synthetic macromolecules or denatured macromolecules being used for feed additives and pharmaceuticals, are in the range of the physical properties described above, and that these moldings have a resistance to destructive stress during pelletization process and is superior in the ability to maintain their shape even after the pelletization.

Based on these findings described above, the inventors of the present invention prepared a feed pellet from a formulation (pelletization-resistant rumen bypass formulation) formed by including one or more rumen bypass formulations in each moldings comprising the various macromolecules (pelletization-resistant protective matrices) having a shape retaining property during a process of pelletization, and they could complete a desired feed pellet which contains feed additive in a form of rumen bypass formulation and capable of preventing the destruction of the rumen bypass formulation therein during the process of pelletization.

In the following, the present invention is now described in detail.

The present invention is directed to a pelletization-resistant rumen bypass formulation which can be pelletized with keeping the rumen bypass effect by applying pelletization-resistant protective matrices, such as natural macromolecules and synthetic macromolecules as a reinforcing measure against a mechanical stress and humidification and heating at steaming during pelletization process to the rumen bypass formulation molded from biologically active principles and protecting matrices, and a feed pellet for ruminants comprising said pelletization-resistant rumen bypass formulation as the component.

(Pelletization-resistant rumen bypass formulation)

Although the shape of the granules of the pelletization-resistant rumen bypass formulation of the present invention is not particularly limited, it is preferable to be a shape having no edges, such as spherical or elliptic shape. The size thereof is not limited as well, however, there is a tendency that the larger ones show better resistance to pelletization, so that the destruction of the particles becomes prominent when the size goes to less 1.5 mm in diameter. The upper limit in size of the particle is not particularly limited, however, it is preferable to be smaller than the diameter of a hole of pellet mill die used for the pelletization.

For examples of the pelletization-resistant rumen bypass formulation comprising a pelletization-resistant protective matrices and the rumen bypass formulation specified in the present invention, the one wherein the rumen bypass formulation is dispersed in a matrix of pelletization-resistant protective materials, the one wherein each particles of the rumen bypass formulation are coated with the pelletization-resistant protective matrices, and the one wherein the outer circumference around the particles of the rumen bypass formulation molded in a round stick shape like a pencil is coated with the pelletization-resistance protective matrices and the like are exemplified.

(Rumen bypass formulation)

Either the structure or the composition of the rumen bypass formulation used of the present invention is not particularly limited. There is no specific limitation in the shape of the particles of the rumen bypass formulation as well, however, the particles having a diameter exceeding 1 mm are preferable, because the large ones tend to show better resistance to pelletization. However, the particle size is not a decisive factor of the resistance, so that it is allowed to select any suitable size in accordance with the shape and size of a feed pellet to be prepared.

The proper content by weight of the rumen bypass formulation in the pelletization-resistant formulation of the invention will depend on the thermal and physical properties and the size of the rumen bypass formulation, type of the protective matrices or the like. However, there is a tendency that such content is the smaller, the resistance of the formulation to pelletization is the better. When the content by weight of the rumen bypass product exceeds 60%, the a number of the particles in the formulation will collapse during the process of pelletization.

(Pelletization-resistant protective matrices)

The pelletization-resistant protective matrices used in the present invention are substances applicable to conventional rumen bypass formulations as a reinforcement measure capable of resisting to a mechanical stress, humidification and heating at steaming during pelletization, etc.

For examples of the materials usable as the pelletization-resistant protective matrices of the invention which contain natural macromolecules as the main component, grains and beams powders, such as wheat flour, corn flour, soybean flour and the like; proteins, such as casein, wheat gluten, zein, soybean protein and the like; and starches, such as wheat starch, corn starch, waxy starch, potato starch, tapioca starch and the like are exemplified.

For examples of the materials usable as the pelletization-resistant protective matrices of the invention which contains denatured natural macromolecules as the main component, starches denatured by alkylesterification, such as acetylated starch, propylated starch and the like; etherificated starches, such as phosphorylated starch, methylated starch, carboxymethylated starch and the like; prepared starches, such as oxidized starch, various bridged starches, dextrin and the like; and various denatured celluloses, such as methyl cellulose, ethyl cellulose, hydroxyethyl cellulose, hydroxypropyl cellulose and the like are exemplified.

For examples of the materials usable as the pelletization-resistant protective matrices of the invention which contains synthetic macromolecules, polyvinylacetaldiethylaminoacetate (AEA), dimethylaminoethylmetacrylate-methylmetacrylic acid copolymer, vinylpyridine-styrene copolymer and the like are exemplified.

(Heating of pelletization-resistant protective matrices)

When natural macromolecules or denatured natural macromolecules derived from living organisms such as starches, prepared starches, proteins and the like are used as the pelletization-resistant protective matrices according to the present invention, the protective effect thereof each based on the macromolecules described above can further be improved by heating those macromolecules, respectively.

The method for heating used in the present invention is not particularly limited. For example, a method that the composition containing living organisms-origin natural or denatured macromolecules is heated and stirred by using an universal mixer with oil bath, a method that the composition is stirred under heating by a kneading machine equipped with heating system, a method that the composition is heated in a extrusion molding machine, then extruded and molded, or a method that the composition is heated in a container or liquid solvent after including the rumen bypass product therein are applicable for the present invention. The temperature for the heating may differ in accordance with the type of the macromolecules used, however, it is generally in the range of from 20° to 200° C.

Many of living organisms-origin macromolecules are denatured by heating. For instance, starch causes α-dislocation or gelatinization by heating, then increasing its transparency. During drying after cooling down to room temperature, if further changes to a hard solid lump. In case of proteins, they solidify during undergoing heating. Since the protective matrices of the present invention is a composition, it will not change in the same manner as a pure material does, however, it is considered that the protective effect must has been improved due to the similar phenomenon as that caused in the pure material.

(Addition of fibrous celluloses)

It is also allowable to incorporate fibrous celluloses in the pelletization-resistant protective matrices as the component thereof, and which can further improve the protective effect to pelletization.

The content of the fibrous celluloses in the pelletization-resistant protective matrices is from 3 parts by weight to 90 parts by weight, preferably from 10 parts by weight to 70 parts by weight based on 100 parts by weight of the dried protective matrices. When the content is out of such range, the increase of the strengthening effect of the protective matrices will be insufficient.

For examples of the fibrous celluloses used in the present invention, powdered cellulose, pulverized pulp, pulp sheet, various kinds of pulps for paper manufacturing, dissolving pulp, papers and the like are exemplified.

(Coating with coat-forming substance)

According to the present invention, the further improvement in the protective effect of the protective matrices can be accomplished by coating the outer surface of the matrices with a coat-forming substance usable as a feedstuff.

For examples of the coat-forming substances to be used in this invention, products obtained in the reaction of a coat-forming substance, such as sodium alginate, gelatin and glycerin and a hardening agent, such as calcium chloride and zirconium nitrate; heat-coagulated egg albumin and the like are exemplified.

Various methods being used for microcapsules formation, such as interfacial polymerization method or the like can be employed for such coat-forming operation. For example, the following methods are applicable for the coat-forcing.

1) A method to incorporate a coat-forming substance such as sodium alginate in the pelletization-resistant protective matrices, molding the mixture to granules, then forming a coat on the surface of each molded granules either by immersing the molded granules into the solution of the hardening agent such as calcium chloride or by spraying the solution of the hardening agent to the surface of the molded granules; or 2) a method to incorporate a hardening agent into the pelletization-resistant protective matrices beforehand, molding it to granules, then contacting the granules to the coat-forming substance to form a coat on the surface of each granules.

Each quantities of the coat-forming substance and the hardening agent to be used in the present invention will depend on the method employed, however, each weight ratios of the coat-forming substance and the hardening agent to be incorporated into the pelletization-resistant protective matrices may be in the range from 0.5% to 10% by weight, preferably from 1% to 5% by weight based on the weight of non-volatile component in the protective matrices.

The thickness of the coat described above is not particularly limited. In the method described above, the coat having a thickness of 10 μm or less is formed.

Although the detail of the mechanism how the protective effect on pelletization is increased by the coat formation has not been known, improvement of the impact resistance of the pelletization-resistant rumen bypass formulation and delay of the swelling of the the formulation when immersed in hot water are observed in the formulation coated.

(Addition of Other Materials)

To the pelletization-resistant protective matrices used in the present invention can be incorporated various kinds of feedstuff pulverized or cut to short fibers, dietary fibers, inorganic materials, such as minerals powder and salts; and various additives, such as antioxidants, preservatives, condiments and flavorings for aiming at reforming of the protective matrices, if required.

(Pelletization)

In various known apparatuses for granulating feedstuffs, major one practically used in the relevant industry is a type for extruding the feedstuffs by using rollers, which is called "Pellet Mill". When operation, feedstuffs are fed from a hopper into the apparatus, humidified and heated by steaming, then continuously pushed into holes of pellet die by using rollers. The feedstuffs are formed to hard feed pellets (hard pellets) during passing through the holes.

Generally in feedstuff industry, "Pellet" is defined as a granulated feedstuff product prepared by using this type of apparatus.

BEST MODE FOR CARRYING OUT THE INVENTION

Best Mode for Carrying Out the Invention

In the following, the present invention is illustrated in detail with referring to the examples.

However, it will be clearly understood that the scope of the present invention is not limited to the description in the examples hereinbelow.

A) Preparation of Rumen By-pass Formulation
(A-1)

25.5 parts by weight of Tallow hardened oil-54° and 25.5 parts by weight of Tallow hardened oil-F.H. were dissolved under heating and stirred in a mixer. In the meantime, 35 parts by weight of methionine, 4 parts by weight of chitosan, 3 parts by weight of calcium carbonate and 7 parts by weight of calcium primary phosphate were added to the above mixture, then the resulting mixture was further mixed and suspended to prepare a dissolving slurry. The granulation was made by spraying the mist of the dissolving slurry from the top of a tower in 20 meter height while blowing cool wind from the bottom of the tower. The granules obtained were separated by sifting, affording the rumen bypass formulation with a diameter of from 0.6 to 1.4 mm.

(A-2)

60 parts by weight of maximum degree hardened rapeseed oil was dissolved under heating and stirred in a mixer. In the meantime, 35 parts by weight of ascorbic acid and 5 parts by weight of zein were added thereto, then the resulting mixture was further stirred and suspended to prepare a dissolving slurry. The granulation was made by spraying the mist of the dissolving slurry from the top of a tower in 20 meter height while blowing cool wind from the bottom of the tower The granules obtained were separated by filtration, affording the rumen bypass formulation with a diameter of from 0.6 to 1.4 mm.

(A-3)

800 parts by weight of saturated triglyceride and 80 parts of weight of glyceryl monolaurate were dissolved under heating and stirred in a mixer. In the meantime, 2 parts by weight of B.H.T., 5 parts by weight of ethyl cellulose, 5 parts by weight of dibutyl phthalate and 5 parts by weight of silica were added to the above mixture. Then 50,000, OOO IU unit of vitamin A, 50 parts by weight of vitamin E and 2 parts by weight of a flavoring were further added thereto and mixed to prepare a dissolving slurry. Then the dissolving slurry was fed dropwise on a cooled steal belt through a nozzle, affording the semi-spherical rumen bypass formulation with a diameter of from 1.0 to 1.5 mm.

(A-4)

650 parts by weight of saturated triglyceride and 100 parts by weight of glyceryl monolaurate were dissolved under heating and stirred in a mixer. In the meantime, 2 parts by weight of B.H.T., 90 parts by weight of corn starch and 100 parts by weight of bentonite were added to the above mixture. Then 100,000,000 IU unit of vitamin A, 8,000,000 IU unit of vitamin $D_3$, 30 parts by weight of vitamin E and 2 parts by weight of a flavoring were further added thereto and mixed to prepare a dissolving slurry. Then the dissolving slurry was fed dropwise on a cooled steal belt through a nozzle, affording the semi-spherical rumen bypass formulation with a diameter of from 1.5 to 2.0 mm.

(A-5)

65 parts by weight of calcium salt of fatty acid, 5 parts by weight of stearic acid and 30 parts by weight of methionine were mixed and placed into a biaxial extruding machine to mold under deairing and reduced pressure at 155° C., then cooled rapidly to obtain a solid product in a cylinder shape with a diameter of from 1.0 to 1.5 mm. The cylinder-shape solid was then cut in a length of from 1.0 to 1.5 mm to obtain a cylindrical rumen bypass formulation.

(A-6)

A rumen bypass formulation was prepared by coating the particles of 98% methionine having an average diameter of from 0.5 to 0.7 mm with a solution comprising 88 g of stearic acid (Melting point 68°–69°C.), 22 g of 2-vinylpyridine-styrene copolymer (70:30), 500 g of 1,2-dichloroethane, 500 g of ethanol and 3 ml of antistatic agent according to fluid bed method.

B) Preparation of pelletization-resistant protective matrics (B-1)

A kneaded composition in a state of paste was prepared by kneading a mixture of 60 parts by weight of wheat flour, 40 parts by weight of wheat gluten and 40 parts by weight of water by using an universal mixer.

(B-2)

A kneaded composition in a state of paste was prepared by kneading a mixture of 100 parts by weight of casein and 100 parts by weight of water by using an roll.

(B-3)

A kneaded composition in a solid state was prepared at room temperature by mixing 60 parts by weight of ethyl cellulose and 40 parts by weight of stearic acid under heating.

(B-4)

A kneaded composition in a state of paste was prepared by mixing a solution consisting of 40 parts by weight of corn starch and 60 parts by weight of water under heating for 60 minutes by using an universal mixer wherein the temperature of oil bath is maintained at 110° C.

(B-5)

A kneaded composition in a state of paste was prepared by mixing a solution consisting of 32 parts by weight of acetylated tapioca starch, 8 parts by weight of powdered cellulose and 50 parts by weight of water under heating for 60 minutes by using an universal mixer wherein the temperature of oil bath is maintained at 110° C.

(B-6)

A kneaded composition in a state of paste was prepared by mixing a solution consisting of 34 parts by weight of waxy starch, 6 parts by weight of pulverized pulp sheet, 1 parts by weight of sodium alginate and 50 parts by weight of water under heating for 60 minutes by using an universal mixer wherein the temperature of oil bath is maintained at 110° C.

C) Preparation of Pelletization-Resistant Rumen Bypass Formulation (C-1)

The mixture comprising 30 parts by weight of the rumen bypass formulation prepared in (A-1) and 70 parts by weight of the pelletization-resistant protective matrices prepared in (B-1) was prepared, then extruded by using an extruding machine in a cylindrical shape with a diameter of 3 mm, and cut in a length of 3 mm to obtain small granules thereof. Then the small granules were placed on a rotary disc to form the shape substantially round, dried, affording the granules of the pelletization-resistant rumen bypass formulation.

(C-2)

The mixture comprising 30 parts by weight of the rumen bypass formulation prepared in (A-2) and 70 parts by weight of the pelletization-resistant protective matrices prepared in (B-1) was prepared, then extruded by using an extruding machine in a cylindrical shape with a diameter of 3 mm, and cut in a length of 3 mm to obtain small granules thereof. Then the small granules were placed on a rotary disc to form the shape substantially round, dried, affording the granules of the pelletization-resistant rumen bypass formulation.

(C-3)

The mixture comprising 40 parts by weight of the rumen bypass formulation prepared in (A-4) and 60 parts by weight of the pelletization-resistant protective matrices prepared in (B-1) was prepared, then extruded by using an extruding machine in a cylindrical shape with a diameter of 3 mm, and cut in a length of 3 mm to obtain small granules thereof. Then the small granules were placed on a rotary disc to form the shape substantially round, dried, affording the granules of the pelletization-resistant rumen bypass formulation.

(C-4)

The mixture comprising 35 parts by weight of the rumen bypass formulation prepared in (A-6) and 65 parts by weight of the pelletization-resistant protective matrices prepared in (B-1) was prepared, then extruded by using an extruding machine in a cylindrical shape with a diameter of 3 mm, and cut in a length of 3 mm to obtain small granules thereof. Then the small granules were placed on a rotary disc to form the shape substantially round, dried, affording the granules of the pelletization-resistant rumen bypass formulation.

(C-5)

The mixture comprising 35 parts by weight of the rumen bypass formulation prepared in (A-4) and 65 parts by weight of the pelletization-resistant protective matrices prepared in (B-2) was prepared, then extruded by using an extruding machine in a cylindrical shape with a diameter of 3 mm, and cut in a length of 3 mm to obtain small granules thereof. Then the small granules were placed on a rotary disc to form the shape substantially round, dried, affording the granules of the pelletization-resistant rumen bypass formulation.
(C-6)
The mixture comprising 30 parts by weight of the rumen bypass formulation prepared in (A-5) and 70 parts by weight of the pelletization-resistant protective matrices prepared in (B-2) was prepared, then extruded by using an extruding machine in a cylindrical shape with a diameter of 3 mm, and cut in a length of 3 mm to obtain small granules thereof. Then the small granules were placed on a rotary disc to form the shape substantially round, dried, affording the granules of the pelletization-resistant rumen bypass formulation.
(C-7)
The mixture comprising 35 parts by weight of the rumen bypass formulation prepared in (A-4) and 65 parts by weight of the pelletization-resistant protective matrices prepared in (B-3) was prepared, then extruded by using an extruding machine in a cylindrical shape with a diameter of 3 mm, and cut in a length of 3 mm to obtain small granules thereof. Then the small granules were placed with talc powder on a rotary disc under heating to form the shape substantially round, cooled, affording the granules of the pelletization-resistant rumen bypass formulation.
(C-8)
The mixture comprising 30 parts by weight of the rumen bypass formulation prepared in (A-5) and 70 parts by weight of the pelletization-resistant protective matrices prepared in (B-3) was prepared, then extruded by using an extruding machine in a cylindrical shape with a diameter of 3 mm, and cut in a length and of 3 mm to obtain small granules thereof. Then the small granules were placed with talc powder on a rotary disc under heating to form the shape substantially round, cooled, affording the granules of the pelletization-resistant rumen bypass formulation.
(C-9)
The mixture comprising 50 parts by weight of the rumen bypass formulation prepared in (A-2) and 50 parts by weight of the pelletization-resistant protective matrices prepared in (B-4) was prepared, then formed in a cylindrical shape with a diameter of 3 mm by using a noodle making machine, and cut in a length of 3 mm to obtain small granules thereof. Then the small granules were placed on a rotary disc to form the shape substantially round, dried, affording the granules of the pelletization-resistant rumen bypass formulation.
(C-10)
The mixture comprising 50 parts by weight of the rumen bypass formulation prepared in (A-5) and 50 parts by weight of the pelletization-resistant protective matrices prepared in (B-4) was prepared, then formed in a cylindrical shape with a diameter of 3 mm by using a noodle making machine, and cut in a length of 3 mm to obtain small granules thereof. Then the small granules were placed on a rotary disc to form the shape substantially round, dried, affording the granules of the pelletization-resistant rumen bypass formulation.
(C-11)
The mixture comprising 50 parts by weight of the rumen bypass formulation prepared in (A-6) and 50 parts by weight of the pelletization-resistant protective matrices prepared in (B-5) was prepared, then formed in a cylindrical shape with a diameter of 3 mm by using a noodle making machine, and cut in a length of 3 mm to obtain small granules thereof. Then the small granules were placed on a rotary disc to form the shape substantially round, dried, affording the granules of the pelletization-resistant rumen bypass formulation.
(C-12)
The mixture comprising 50 parts by weight of the rumen bypass formulation prepared in (A-1) and 50 parts by weight of the pelletization-resistant protective matrices prepared in (B-5) was prepared, then formed in a cylindrical shape with a diameter of 3 mm by using a noodle making machine, and cut in a length of 3 mm to obtain small granules thereof. Then the small granules were placed on a rotary disc to form the shape substantially round, dried, affording the granules of the pelletization-resistant rumen bypass formulation.
(C-13)
The mixture comprising 50 parts by weight of the rumen bypass formulation prepared in (A-5) and 50 parts by weight of the pelletization-resistant protective matrices prepared in (B-6) was prepared, then formed in a cylindrical shape with a diameter of 3 mm by using a noodle making machine, and cut in a length of 3 mm to obtain small granules thereof. Then the small granules were placed on a rotary disc to form the shape substantially round, dried, affording the granules of the pelletization-resistant rumen bypass formulation.
(C-14)
The mixture comprising 50 parts by weight of the rumen bypass formulation prepared in (A-1) and 50 parts by weight of the pelletization-resistant protective matrices prepared in (B-6) was prepared, then formed in a cylindrical shape with a diameter of 3 mm by using a noodle making machine, and cut in a length of 3 mm to obtain small granules thereof. Then the small granules were placed on a rotary disc to form the shape substantially round, sprayed with 10% solution of calcium chloride, mixed with talc powder to prevent the adhesion in between the granules, and dried, affording the granules of the pelletization-resistant rumen bypass formulation.

D) Pelletization

The granules prepared according to each examples of from (A-1) to (A-6) and from (C-1) to (C-14) were respectively mixed with raw rice bran in the weight ratios shown in Table 1, then the mixtures were each pelletized by using a pellet mill (50Hb; Buhler).

E) Assessment the items for assessment and the results are shown in Tables 1-1 through 1-3 and Table 2.

The details of the items listed in Tables 1-1, 1-2, 1-3 and 2 are as follows.

Pellet: Feed pellet

Formulations: Rumen bypass formulations (From A-1 to A-6) and pelletization-resistant rumen bypass formulations (From C-1 to C-14)

RB Formulation: Rumen bypass formulation

Feedstuff: Raw rice bran was used in the present invention, since it does not give obstacles at measuring elution ratios and can make the observation and pick-up of the formulation incorporation in the pellets easy.

Mc elution ratio: This is defined as a ratio of the amount of the active principles eluted to Mc solution to the amount of the same active principles contained in the formulation, when either of the formulation or the feed pellet was immersed in Mc solution and shaken for 24 hours.

This ratio is substantially equivalent to the amount eluted into a rumen.

Cl elution ratio: This is defined as a ratio of the amount of the active principles eluted to CL solution when shaken the solid immersed in CL solution, which is then separated by filtration after the measurement of Mc elution ratio, for 3 hours to the amount of the same active principles contained in the formulation. This ratio is substantially equivalent to the amount of the active principles eluted into fourth rumen stomach.

Mc solution: This solution is corresponding to the gastric fluid of first rumen stomach, wherein 9.8 g of sodium hydrogencarbonate, 0.57 g of potassium chloride, 9.30 g of disodium phosphate 12 hydrate, 0.47 g of sodium chloride and 0.12 g of magnesium sulfate 7 hydrate are dissolved in water, then adjusted to 1 l in total volume.

Cl solution: This solution is corresponding to the gastric fluid of fourth rumen stomach, wherein 50 ml of 0.2N potassium chloride and 10 ml of 0.2N hydrochloric acid are dissolved in water, then adjusted to 200 ml in total volume.

TABLE 1-1

Results of Pelletization Test (Examples)

| Example No. | Example 1 | Example 2 | Example 3 | Example 4 | Example 5 |
|---|---|---|---|---|---|
| Formulation No. | C-1 | C-2 | C-3 | C-4 | C-5 |
| Property of Formulation | | | | | |
| Shape | Spherical | Spherical | Spherical | Spherical | Spherical |
| Outer Diameter (mm) | 2.5–3.5 | 2.5–3.5 | 2.5–3.5 | 2.5–3.5 | 2.5–3.5 |
| Biologically Active Principles | Methionine | L-ascorbic acid | Vitamin A Vitamin $D_3$ Vitamin E | Methionine | Vitamin A Vitamin $D_3$ Vitamin E |
| Mc Elution Ratio (%) 24H | 10 | 33 | 29 | 4 | 35 |
| CL Elution Ratio (%) 3H | 55 | 49 | 55 | 88 | 56 |
| Conditions for Pelletization | | | | | |
| Basic Feedstuff | Raw rice bran | Raw rice bran | Raw rice bran | Raw rice bran | Raw rice bran |
| Conc. of Pelletization-Resistant Formulation | 15% | 15% | 15% | 15% | 15% |
| Conc. of Ruminal By-Pass Formulation | 4.5% | 4.5% | 6.0% | 5.3% | 5.3% |
| Temperature of Pellet Die(°C.) | 85 | 85 | 85 | 85 | 84 |
| Property of Pellet | | | | | |
| Condition of Pellet | Good | Good | Good | Good | Good |
| Change in Formulation Shape | Slightly deformed | Slightly deformed | Slightly deformed | Slightly deformed | Slightly deformed |
| Mc Elution Ratio (%) 24H | 18 | 40 | 39 | 18 | 40 |
| CL Elution Ratio (%) 3H | 51 | 49 | 54 | 81 | 51 |

TABLE 1-2

Results of Pelletization (Examples, Continued)

| Example No. | Example 7 | Example 8 | Example 9 | Example 10 |
|---|---|---|---|---|
| Formulation No. | C-7 | C-8 | C-9 | C-10 |
| Property of Formulation | | | | |
| Shape | Spherical | Spherical | Spherical | Cylindrical |
| Outer Diameter (mm) | 2.5–3.5 | 2.5–3.5 | 2.5–3.5 | 2.5–3.5 |
| Biologically Active Principles | Vitamin A Vitamin $D_3$ Vitamin E | Methionine | L-ascorbic acid | Methionine |
| Mc Elution Ratio (%) 24H | 34 | 23 | 31 | 24 |
| CL Elution Ratio (%) 3H | 52 | 50 | 44 | 45 |
| Conditions for Pelletization | | | | |
| Basic Feed | Raw rice bran | Raw rice bran | Raw rice bran | Raw rice bran |
| Conc. of Pelletization-Resistant Formulation | 15% | 15% | 10% | 10% |
| Conc. of Ruminal By-Pass Formulation | 5.3% | 4.5% | 5% | 5% |
| Temperature of Pellet Die (°C.) | 85 | 84 | 82 | 85 |
| Property of Pellet | | | | |
| Condition of Pellet | Good | Good | Good | Good |
| Change in Formulation Shape | Slightly deformed | Slightly deformed | Substantially no change | Substantially no change |
| Mc Elution Ratio (%) 24H | 36 | 34 | 35 | 28 |
| CL Elution Ratio (%) 3H | 55 | 65 | 52 | 55 |

TABLE 1-3

Results of Pelletization Test (Examples, Continued)

| Example No.<br>Formulation No. | Example 11<br>C-11 | Example 12<br>C-12 | Example 13<br>C-13 | Example 14<br>C-14 |
|---|---|---|---|---|
| Property of Formulation | | | | |
| Shape | Spherical | Spherical | Spherical | Spherical |
| Outer Diameter (mm) | 2.5–3.5 | 2.5–3.5 | 2.5–3.5 | 2.5–3.5 |
| Biologically Active Principles | Methionine | Methionine | Methionine | Methionine |
| Mc Elution Ratio (%) 24H | 8 | 14 | 26 | 15 |
| CL Elution Ratio (%) 3H | 79 | 50 | 53 | 54 |
| Conditions for Pelletization | | | | |
| Basic Feed | Raw rice bran | Raw rice bran | Raw rice bran | Raw rice bran |
| Concentration of Pelletization Resistant Formulation | 10% | 10% | 10% | 10% |
| Concentration of Ruminal By-Pass Formulation | 5% | 5% | 5% | 5% |
| Temperature of Pellet Die(°C.) | 85 | 84 | 85 | 85 |
| Property of Pellet | | | | |
| Condition of Pellet | Good | Good | Good | Good |
| Change in Formulation Shape | Substantially no change | Substantially no change | Substantially no change | Substantially no change |
| Mc Elution Ratio (%) 24H | 11 | 20 | 28 | 15 |
| CL Elution Ratio (%) 3H | 77 | 56 | 57 | 53 |

TABLE 2

Results of Pelletization Test (Comparative Examples)

| Comparative Example No.<br>Formulation No. | Comparative Example 1<br>A-1 | Comparative Example 2<br>A-2 | Comparative Example 3<br>A-3 | Comparative Example 4<br>A-4 | Comparative Example 5<br>A-5 | Comparative Example 6<br>A-6 |
|---|---|---|---|---|---|---|
| Property of Formulation | | | | | | |
| Shape | Spherical | Spherical | Semispherical | Semispherical | Cylindrical | Cylindrical |
| Outer Diameter (mm) | 0.6–1.4 | 0.6–1.4 | 1.0–1.5 | 1.0–2.0 | 1.0–1.5 | 1.0–1.5 |
| Biologically Active Principles | Methionine | L-ascorbic acid | Vitamin A Vitamin E | Vitamin A Vitamin $D_3$ Vitamin E | Methionine | Methionine |
| Mc Elution Ratio (%) 24H | 11 | 35 | 37 | 31 | 25 | 5 |
| CL Elution Ratio (%) 3H | 57 | 45 | 38 | 56 | 48 | 90 |
| Conditions for Pelletization | | | | | | |
| Basic Feed | Raw rice bran | Raw rice bran | Raw rice bran | Raw rice bran | Raw rice bran | Raw rice bran |
| Concentration of Pelletization Resistant Formulation | — | — | — | — | — | — |
| Concentration of Ruminal By-Pass Formulation | 5% | 5% | 10% | 5% | 5% | 5% |
| Temperature of Pellet Die(°C.) | 82 | 81 | 82 | 84 | 84 | 85 |
| Property of Pellet | | | | | | |
| Condition of Pellet | Good | Good | Good | Good | Good | Good |
| Change in Formulation Shape | Powdered | Powdered | Powdered | Powdered | Powdered | Powdered |
| Mc Elution Ratio (%) 24H | 98 | 97 | 93 | 95 | 98 | 95 |
| CL Elution Ratio (%) 3H | 1 | 3 | 7 | 4 | 1 | 5 |

(Advantageous Effects of the Invention)

As shown in Table 2, all of the pellets directly pelletized from each of the rumen bypass formulation prepared in the examples A-1 through A-6 were not practically useful at all, since they are destroyed, having great value of Mc elution ratio and extremely lowered rumen bypass effect. Contrary to the above, the pelletization-resistant rumen bypass formulation prepared in the examples C-1 through C-8 in the present specification maintained good rumen bypass effect even after undergoing the process of pelletization and the change in the shape thereof was relatively little.

The pelletization-resistant rumen bypass formulation prepared in the example C-9 through C-14 tend to show better protective effect than those prepared in C-1 through C-8. Furthermore, the formulation prepared in the examples C-9 through C-14 maintained those Mc elution ratio to a level close to the level of the formulation before pelletization even though the ratio of the rumen bypass formulation contained in the pellets was elevated, thus showing that high rumen bypass effect is maintained by the formulation.

As stated above, a feed pellet comprising rumen bypass formulation capable of retaining rumen bypass effect as its component was obtained by including the rumen bypass formulation in the molded matrices comprising macromolecules usable as a feed, thereby allowing to prevent the destruction of the rumen bypass formulation during a process of pelletization.

According to the method of the present invention, practical use of a feed pellet including the rumen bypass formulation is now feasible.

The present invention is principally accomplished based on the protection of the rumen bypass formulation by giving mechanical reinforcement thereto as well as the protection from heating. Since the pelletization-resistant protective matrices are also usable as a feedstuff, it will be an additional advantage for the present invention if nutritional materials are selected for the matrices.

INDUSTRIAL APPLICABILITY

Since the feed pellet for ruminants specified in the present invention includes biologically active principles therein in a form of rumen bypass formulation, it can be used as a favorable feed for ruminants such as cows and sheeps in dietetic and clinical point of view.

What is claimed is:

1. A feed additive composition suitable for use in a feed pellet comprising a rumen bypass formulation formed from a biologically active ingredient and a protective matrix and further comprising a pelletization protective matrix selected from the group consisting of natural macromolecules, denatured natural macromolecules and synthetic macromolecules and wherein said macromolecules have a modulus of elasticity from between $10^8$ to $10^{11}$ dyne/cm$^2$ at a temperature of 30° C. and a glass transition point of from between 50° to 150° C. by a dynamic viscoelasticity measurement.

2. The feed additive composition of claim 1 wherein the natural macromolecules are selected from the group consisting of wheat flour, soybean flour, casein, gluten, zein, soybean protein, wheat starch corn starch, waxy starch, tapioca starch and mixtures thereof.

3. The feed additive composition of claim 1 wherein the denatured natural macromolecules are selected from the group consisting of prepared wheat starch, prepared corn starch, prepared waxy starch, prepared tapioca starch and mixtures thereof.

4. The feed additive composition of claim 1 wherein the denatured natural macromolecules are selected from the group consisting of methyl cellulose, ethyl cellulose, hydroxyethyl cellulose hydroxypropyl cellulose and mixtures thereof.

5. The feed additive composition of claim 1 wherein the synthetic macromolecules are selected from the group consisting of polyvinylacetaldiethylaminoacetate, dimethylaminoethylmethacrylatemethyl metacrylate copolymer and vinylpyridine-styrene copolymer and mixtures thereof.

6. The feed additive composition of claim 1 wherein the natural macromolecules and denatured natural macromolecules are heat treated to obtain improved pelletization protective properties.

7. The feed additive composition of claim 1 further comprising fibrous cellulose.

8. The feed additive composition of claim 1 molded into a spherical or elliptical form.

9. The feed additive composition of claim 8 wherein said molded form is coated with feed.

10. The feed additive composition of claim 1 further comprising a coat forming substance.

11. The feed additive composition of claim 10 wherein said coat forming substance comprises a component selected from the group consisting of sodium alginate, gelatin and glycerin and a hardening agent selected from the group consisting of calcium chloride and zirconium nitrate.

12. The feed additive composition of claim 10 wherein said coat forming substance is heat-coagulated egg albumin.

13. A feed pellet comprising a feed additive composition of claim 1.

* * * * *